United States Patent
Yokoyama (10) Patent No.: US 11,229,945 B2
(45) Date of Patent: Jan. 25, 2022

(54) BRAKE DISC AND BRAKE DISC MANUFACTURING METHOD

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/715,562

(22) Filed: Dec. 16, 2019

(65) Prior Publication Data

US 2020/0222970 A1   Jul. 16, 2020

(30) Foreign Application Priority Data

Jan. 14, 2019  (JP) .............................. JP2019-003982

(51) Int. Cl.
  *F16D 65/12*   (2006.01)
  *B21K 1/32*   (2006.01)

(52) U.S. Cl.
  CPC .............. *B21K 1/32* (2013.01); *F16D 65/123* (2013.01); *F16D 2250/0023* (2013.01); *F16D 2250/0061* (2013.01); *F16D 2250/0084* (2013.01)

(58) Field of Classification Search
  CPC ...... F16D 65/12; F16D 65/124; F16D 65/125; F16D 65/128
  USPC .............. 188/18 A, 218 XL, 264 A, 264 AA
  See application file for complete search history.

(56) References Cited

U.S. PATENT DOCUMENTS

| | | | | |
|---|---|---|---|---|
| 2,869,688 | A * | 1/1959 | Busch | F16D 65/124 188/218 XL |
| 3,610,873 | A * | 10/1971 | Vansteenkiste | F16D 65/128 219/121.14 |
| 5,183,632 | A * | 2/1993 | Kiuchi | B22F 7/06 419/10 |
| 6,032,769 | A * | 3/2000 | Daudi | F16D 65/0006 188/218 R |
| 6,142,267 | A * | 11/2000 | Sporzynski | F16D 65/12 188/218 XL |
| 8,408,369 | B2 * | 4/2013 | Woychowski | F16D 65/12 188/218 XL |
| 9,791,007 | B2 * | 10/2017 | Wurth | F16D 65/122 |
| 2008/0135359 | A1 * | 6/2008 | Basirico | F16D 69/023 188/218 XL |
| 2010/0206675 | A1 * | 8/2010 | Miyake | F16D 65/12 188/218 XL |
| 2010/0314208 | A1 * | 12/2010 | Martino | C22C 29/005 188/218 XL |

(Continued)

FOREIGN PATENT DOCUMENTS

| CN | 101865223 A | 10/2010 |
|---|---|---|
| CN | 108317194 A | 7/2018 |

(Continued)

*Primary Examiner* — Christopher P Schwartz
(74) *Attorney, Agent, or Firm* — Sughrue Mion, PLLC (57) ABSTRACT

The brake disc includes two first members and at least one second member. Each of the first members has a sliding surface, and has almost a disc shape or an almost annular plate shape. The second member has a plurality of fins and a fin holding part. Each of the two first members and the at least one second member is manufactured by pressing. The brake disc is manufactured as the two first members and the at least one second member manufactured by pressing are joined to each other.

9 Claims, 8 Drawing Sheets

(56) References Cited

U.S. PATENT DOCUMENTS

2019/0162261 A1    5/2019  Yokoyama
2021/0010552 A1*   1/2021  Paggi .................... F16D 65/128

FOREIGN PATENT DOCUMENTS

| JP | 2010-106917 A | 5/2010 |
| JP | 2017-013099 A | 1/2017 |
| JP | 2019-095002 A | 6/2019 |

* cited by examiner

BRAKE DISC AND BRAKE DISC MANUFACTURING METHOD

INCORPORATION BY REFERENCE

The disclosure of Japanese Patent Application No. 2019-003982 filed on Jan. 14, 2019 including the specification, drawings and abstract is incorporated herein by reference in its entirety.

BACKGROUND

1. Technical Field

The disclosure relates to a brake disc used in a disc brake, and to a brake disc manufacturing method.

2. Description of Related Art

A brake disc described in Japanese Unexamined Patent Application Publication No. 2010-106917 (JP 2010-106917 A) is made as a joining device joins a hat part and a single sliding part integrally to each other. The sliding part includes a pair of sliding surfaces and a plurality of fins. The sliding surfaces are positioned on an opposite side from each other, and the fins are positioned between the sliding surfaces. The hat part includes a mounting part that is used to mount the brake disc on a hub.

SUMMARY

An object of the disclosure is to achieve a cost reduction of a brake disc as well as an improvement of cooling performance of the brake disc.

A brake disc according to the disclosure includes two first members and at least one second member. Each of the first members has a sliding surface and has an almost disc shape or an almost annular plate shape. The at least one second member includes a plurality of fins and a fin holding part. Each of the two first members and the at least one second member is manufactured by pressing. As described above, the brake disc is manufactured as the two first members and the at least one second member manufactured by pressing are joined to each other. As a result, compared to a case where the brake disc is manufactured by casting, it is possible to make the fins thinner and provide a larger number of the fins, and it is thus possible to improve cooling performance. Further, since a thickness of each of the first members and the second member can be reduced, it is possible to reduce weight of the brake disc and achieve a cost reduction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a brake disc that is an embodiment of the disclosure is described with reference to the drawings. The brake disc can be manufactured by a brake disc manufacturing method that is an embodiment of the disclosure. The brake disc according to the embodiment is mounted on a wheel so that the brake disc is able to rotate together with the wheel. For example, the brake disc is mounted on a hub or a rotary driving shaft of a wheel. For example, when the brake disc is applied to a friction brake of a wheel in which an in-wheel motor is installed, the brake disc may be directly mounted without use of the hub on at least either an output shaft of the in-wheel motor, the output shaft serving as the rotary driving shaft, or an output shaft of a reduction gear in a case where rotation of the in-wheel motor is reduced by the reduction gear and output. It is possible to mount the brake disc directly on the rotary driving shaft with use of, for example, a key and a key groove so that the brake disc is able to rotate integrally with the rotary driving shaft.

Figure 1:
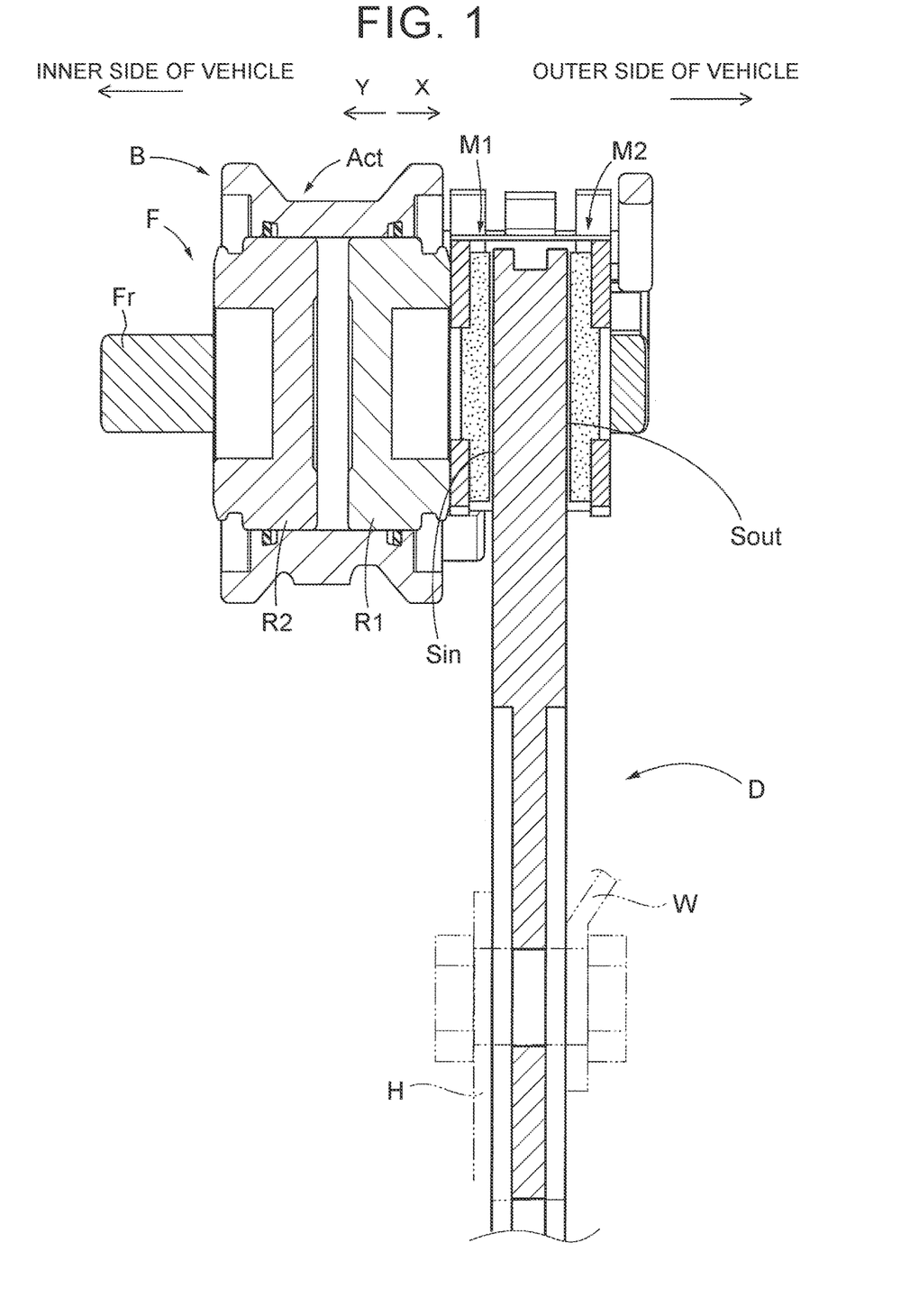
FIG. 1 is a sectional view of a disc brake to which a brake disc according to the disclosure is applied. The brake disc may be manufactured by a brake disc manufacturing method according to the disclosure.

For example, as shown in FIG. 1, a brake disc D may be applied to a disc brake B. The brake disc D is mounted on a wheel W through a hub H so that the brake disc D is able to rotate integrally with the wheel W. The disc brake B includes friction engaging members M1, M2 positioned on both sides of the brake disc D, respectively, and a pressing device F that presses the friction engaging members M1, M2 against the brake disc D. The pressing device F includes, for example, an actuator Act provided in a member on a vehicle body side (not shown), and a frame Fr. In the actuator Act, as a first pressing member R1 is moved in an X direction, the friction engaging member M1 is pressed against a sliding surface Sin of the brake disc D. Also, as a second pressing member R2 is moved in a Y direction that is opposite from a direction in which the first pressing member R1 is moved, the frame Fr is moved in the Y direction. Thus, the friction engaging member M2 is pressed against a sliding surface Sout of the brake disc D. Thus, the disc brake B is activated, rotation of the brake disc D is restrained, and rotation of a wheel is thus suppressed.

Figure 2A:
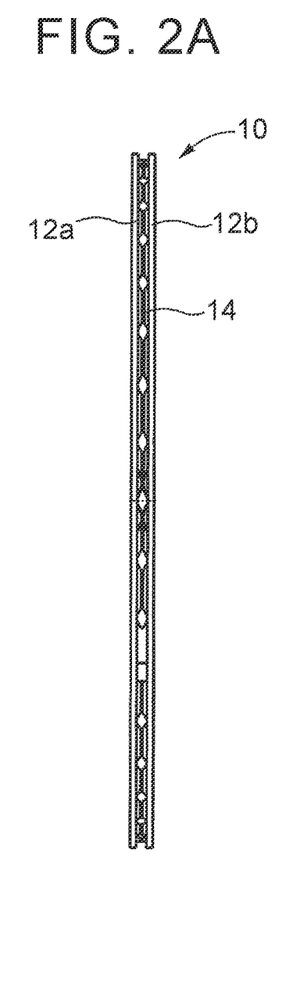
FIG. 2A is a side view of a brake disc according to a first example of the disclosure.
Figure 2B:
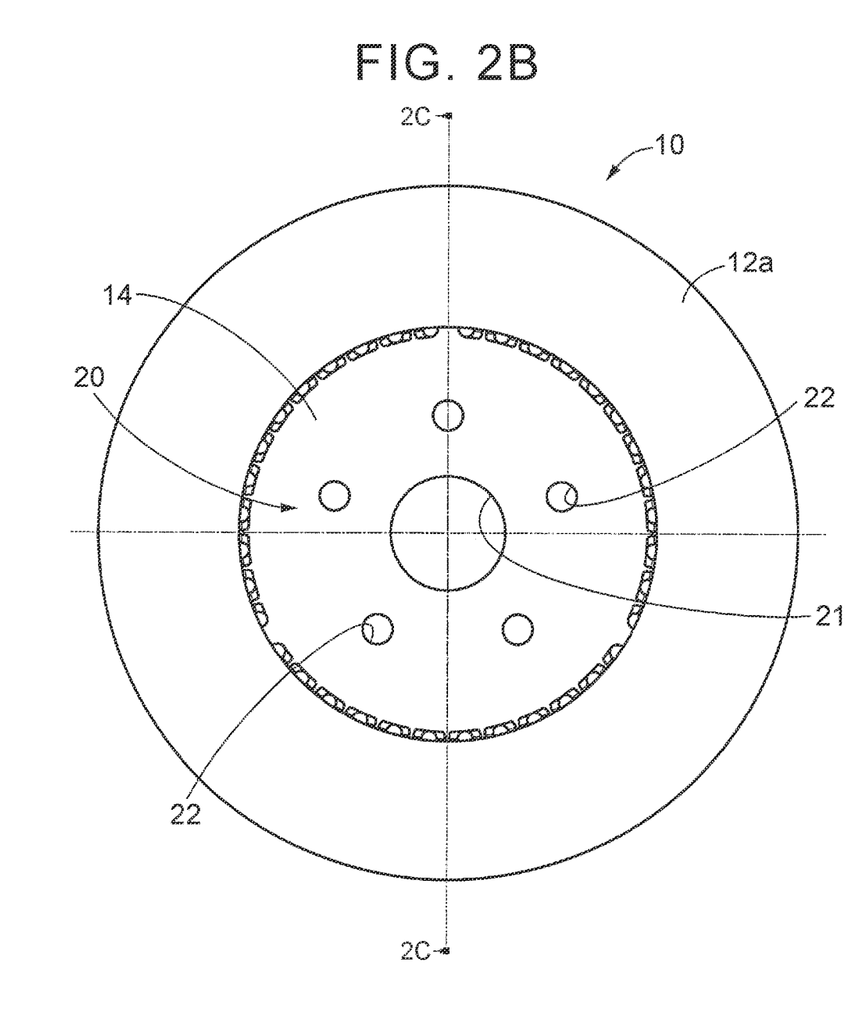
FIG. 2B is a front view of the brake disc according to the first example of the disclosure.
Figure 2C:
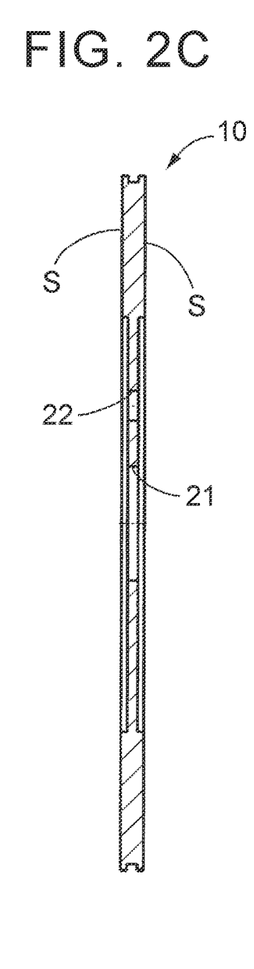
FIG. 2C is a sectional view of the brake disc according to the first example of the disclosure, taken along the line 2C-2C.
Figure 3:
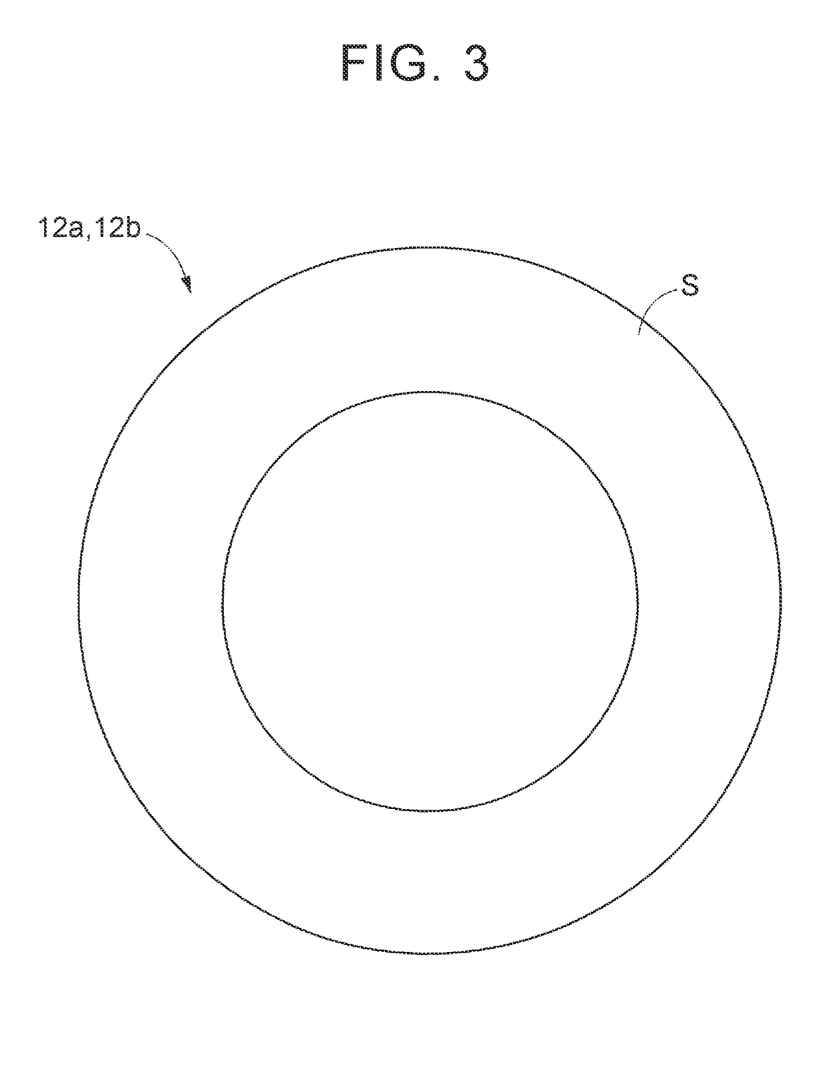
FIG. 3 is a front view of a first member that is a component of the brake disc.

As shown in FIG. 2A to FIG. 2C, a brake disc 10 serving as the brake disc D in a first example includes a pair of first members 12a, 12b, and a second member 14 positioned between the first members 12a, 12b. As shown in FIG. 3, each of the first members 12a, 12b has an almost annular plate shape and has a sliding surface S on which the friction engaging member slides.

Figure 4:
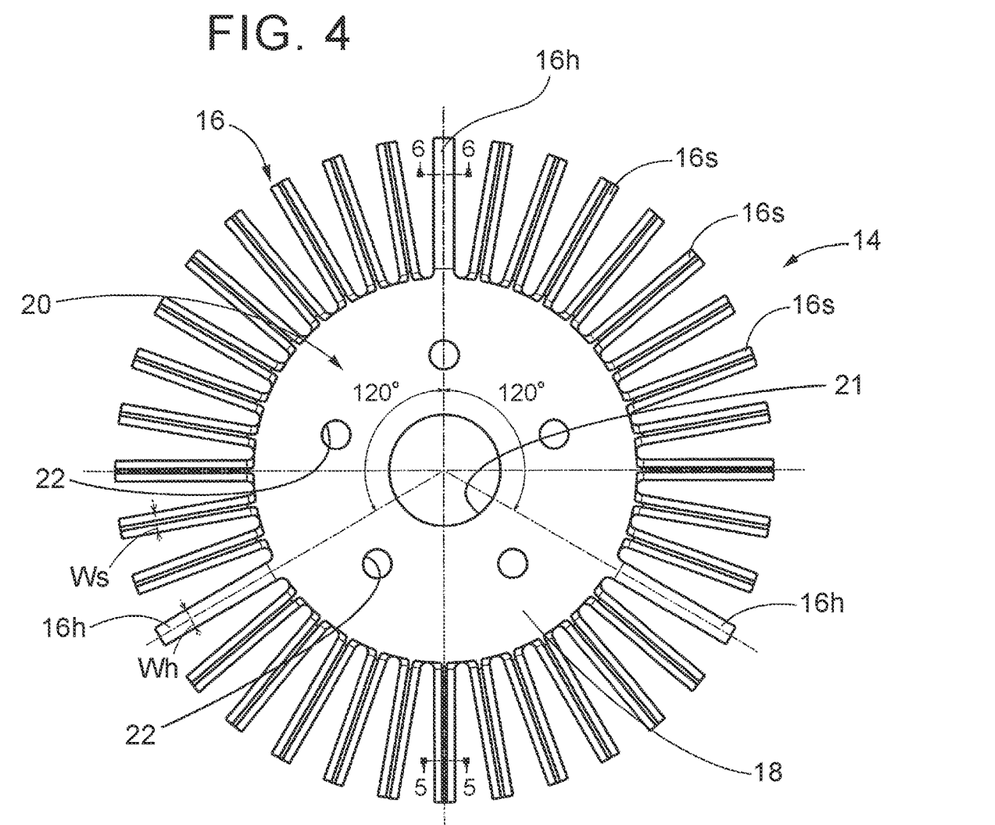
FIG. 4 is a front view of a second member that is a component of the brake disc.

As shown in FIG. 4, the second member 14 includes a plurality of fins 16 and a fin holding part 18 that holds the fins 16. The fin holding part 18 has an almost disc shape, and a mounting part 20 is provided in a center part of the fin holding part 18. The mounting part 20 is used to mount the brake disc 10 on a hub so that the brake disc 10 rotates integrally with the hub. In this example, the mounting part 20 includes a central through-hole 21 and a plurality of bolt mounting holes 22. The central through-hole 21 is formed in a center part of the second member 14, and the bolt mounting holes 22 are provided around the central through-hole 21.

The fins 16 are provided in an almost radial direction from an outer peripheral part of the fin holding part 18. This means that the fins 16 are provided so as to extend radially. The fins 16 include first fins 16h and the remaining second fins 16s.

Figure 5:
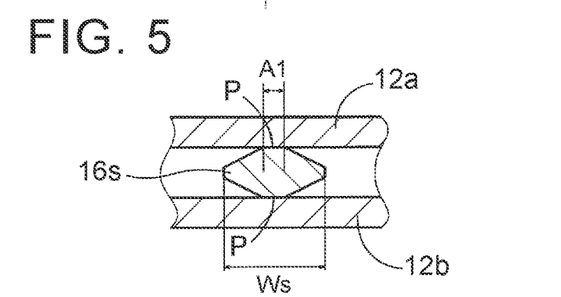
FIG. 5 is a sectional view taken along the line 5-5 in FIG. 4.
Figure 6:
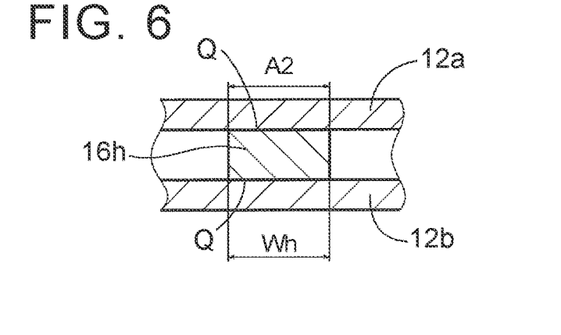
FIG. 6 is a sectional view taken along the line 6-6 in FIG. 4.
Figure 7A:
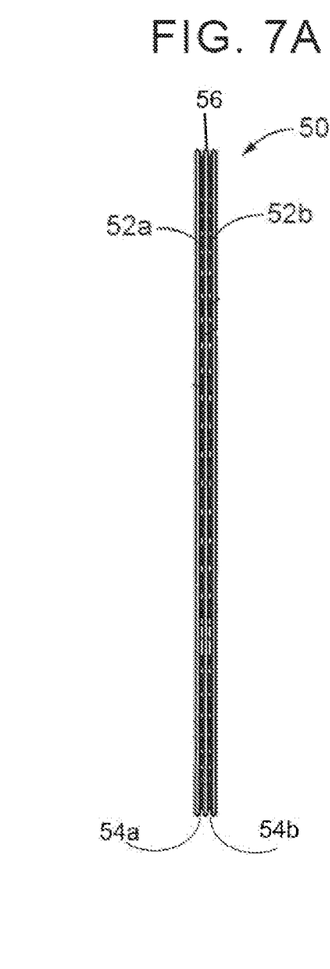
FIG. 7A is a side view of a brake disc according to a second example of the disclosure.
Figure 7B:
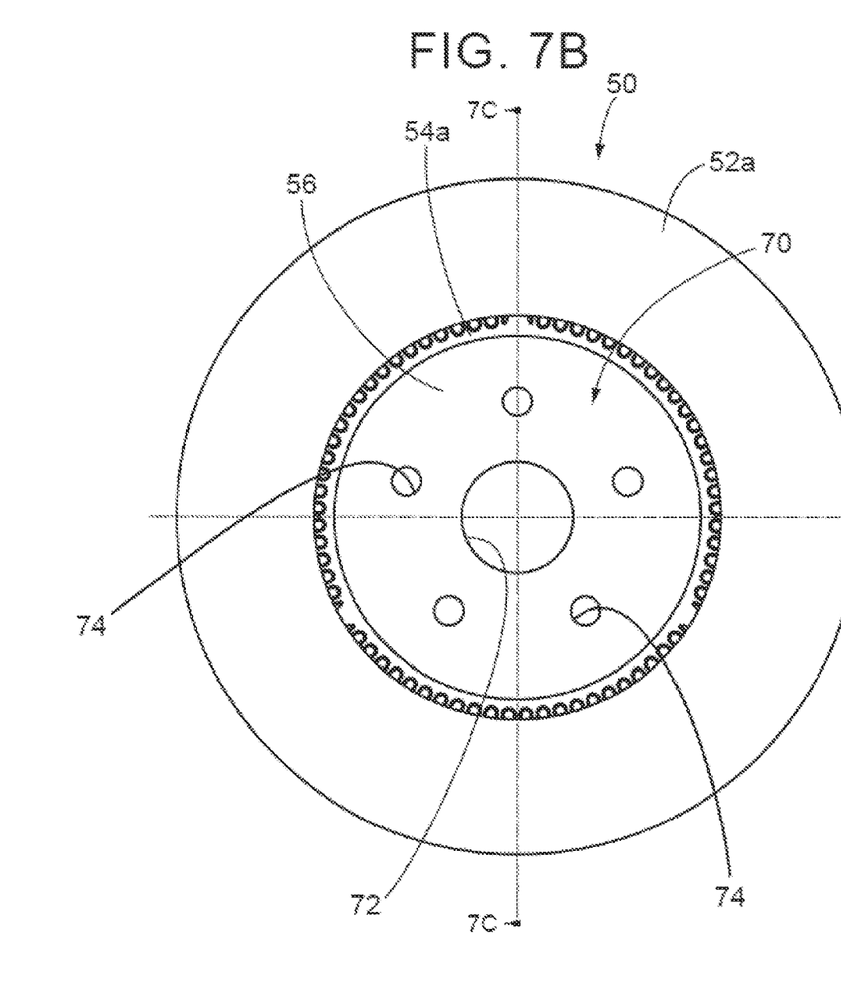
FIG. 7B is a front view of the brake disc according to the second example of the disclosure.
Figure 7C:
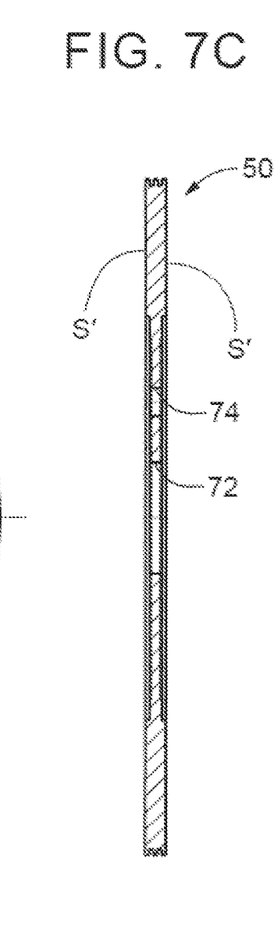
FIG. 7C is a sectional view of the brake disc according to the second example of the disclosure, taken along the line 7C-7C.

The first fins 16h are three of the fins positioned at intervals of a set central angle (for example, 120°). In the second member 14, the first fins 16h are provided evenly without being concentrated or biased in one place. Also, as shown in FIG. 6, a section of each of the first fins 16h orthogonal to the radial direction is an almost rectangular shape. As shown in FIG. 5, a section of each of the second fins 16s orthogonal to the radial direction has an almost rhombus shape. The section of the second fin 16s is a shape in which vertices of the rhombus are cut out so as to have flat surfaces.

Contact surfaces of each of the second fins 16s with the first members 12a, 12b are flat surfaces P, respectively. However, an area A2 of each of contact surfaces Q of each of the first fins 16h with the first members 12a, 12b is larger than an area A1 of each of the flat surfaces P that are the contact surfaces of the second fins 16s. Further, a width Wh of each of the first fins 16h is almost the same as a maximum width value Ws of each of the second fins 16s. However, the width Wh is larger than a mean value of the widths of the second fins 16s. Further, a diameter of a circle defined by distal ends of the fins 16 of the second member 14 is almost the same as outside diameters of the first members 12a, 12b.

In this example, each of the first members 12a, 12b and the second member 14 is manufactured by pressing. Conventionally, a brake disc is manufactured by casting and it is thus difficult to reduce a width of each fin, an improvement of cooling performance is thus difficult. Further, since it is difficult to reduce a thickness, it is also difficult to reduce a weight and cost. Meanwhile, a brake disc often has a hat part that has a relatively large offset quantity. Therefore, even if a brake disc is divided into two first members each having an annular plate shape with sliding surfaces, and a second member having a plurality of fins and a hat part, as long as the second member is manufactured by pressing, deep drawing becomes necessary in order to form the hat part with a large offset quantity.

On the contrary, in this example, the brake disc 10 is divided into three members that are the first members 12a, 12b and the second member 14. Also, the second member 14 includes the fin holding part 18 that has an almost disc shape, and does not have the hat part. For example, as shown in FIG. 1, when, for example, the brake disc 10 is applied to a disc brake in which a protrusion of a part of the pressing device on a vehicle outer side is small, it is possible to reduce the offset quantity of the hat part in terms of mounting on the wheel, and it is also possible to achieve zero offset quantity. Therefore, deep drawing is not necessary for the second member 14, and pressing can be done inexpensively.

The brake disc 10 is manufactured as described below. (I) The first members 12a, 12b, and the second member 14 are manufactured by pressing (a pressing step). (II) The first members 12a, 12b and the second member 14 are faced to each other through a copper foil, respectively, in a state where the second member 14 is positioned in the center, and the first members 12a, 12b are positioned on both sides of the second member 14, respectively, so that the sliding surfaces S are positioned on opposite sides from one another. (III) The first members 12a, 12b and the second member 14 are heated to copper melting temperature (1085° C.) or higher (a bonding step, a welding step). As a result, the first members 12a, 12b and the second member 14 are welded and bonded to each other, and the brake disc 10 is thus manufactured.

As described above, since the second member 14 is manufactured by pressing, it is possible to make the fins thinner and provide more fins compared to a case where the second member 14 is manufactured by casting. Further, a material is uniformized, it is possible to reduce a thickness of each of the first members 12a, 12b and the second member 14. As a result, it is possible to improve cooling performance of the brake disc 10 and reduce weight and cost.

Further, in each of the first fins 16h provided, the area A2 of the contact surface Q is larger than the area A1 of the contact surface P of each of the contact surfaces of each of the second fins 16s with the first members 12a, 12b. Therefore, it is possible to improve a bonding property between the first members 12a, 12b and the second member 14 to each other. Meanwhile, because the sectional shape of each of the second fins 16s is the rhombus shape, a contact area of each of the second fins 16s with air becomes large, thereby improving cooling performance. As described earlier, since the fins 16 include the first fins 16h and the second fins 16s, it is possible to achieve improvement of both the weld bonding property and the cooling performance.

For example, as the first fins 16h are positioned at intervals of 90° or 60°, it is possible to increase the number of the first fins 16h. In this case, it is possible to improve the weld bonding property between the first members 12a, 12b and the second member 14 even further. On the other hand, when the number of the second fins 16s is increased, it is possible to improve the cooling performance even further. In consideration of these situations, it is possible to determine a set central angle at which the first fins 16h are provided.

In the first example, the second member 14 has no hat part. However, the second member 14 may include a hat part with an offset quantity that does not hider pressing. Further, one of the first members may be formed into an almost disc shape, and the other first member may be formed into an almost annular plate shape. At the same time, the fin holding part of the second member may be formed into an almost annular plate shape. In this brake disc, the center of the brake disc in its thickness direction is not mounted on the hub. Instead, one side of the brake disc (the first member that has the disc shape) is mounted on the hub.

Figure 8:
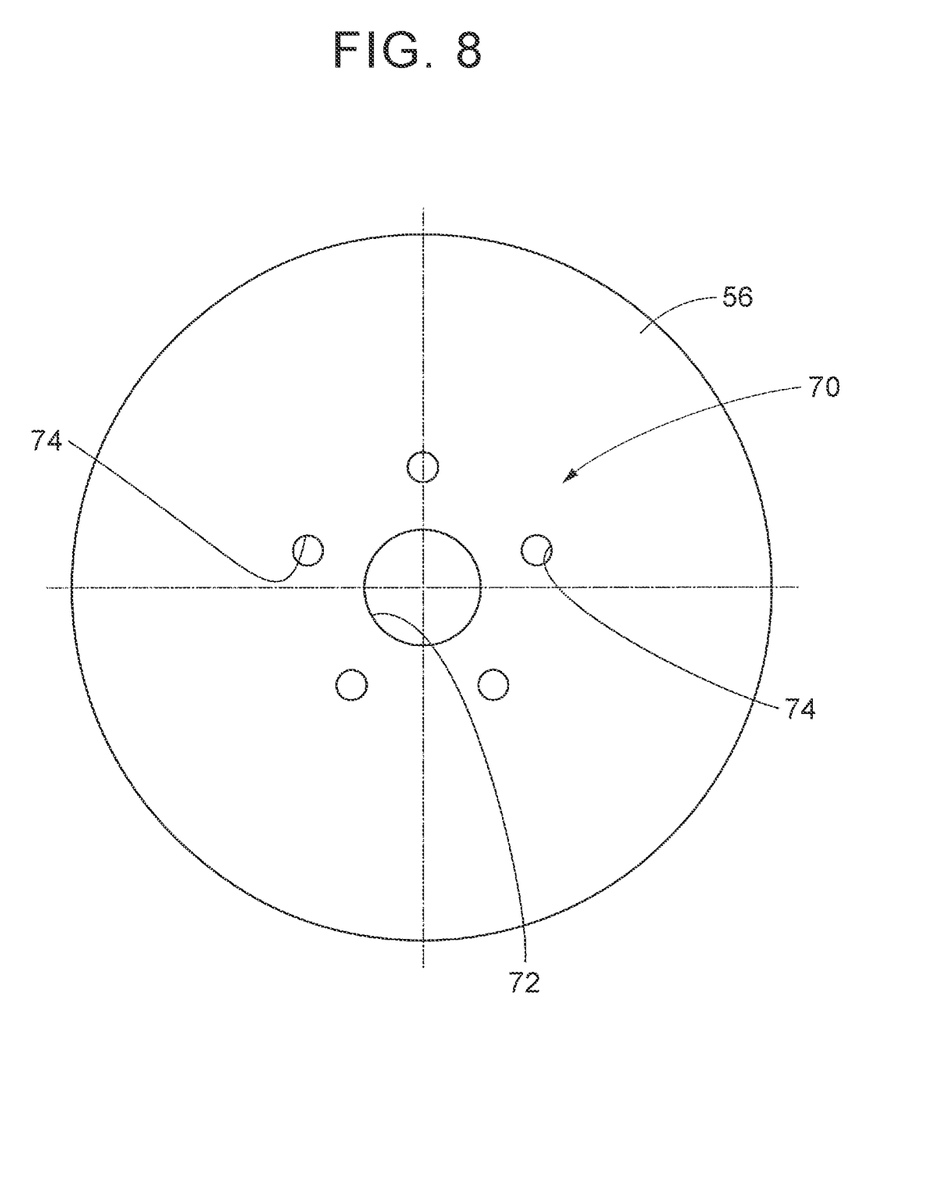
FIG. 8 is a front view of a third member that is a component of the brake disc.
Figure 9:
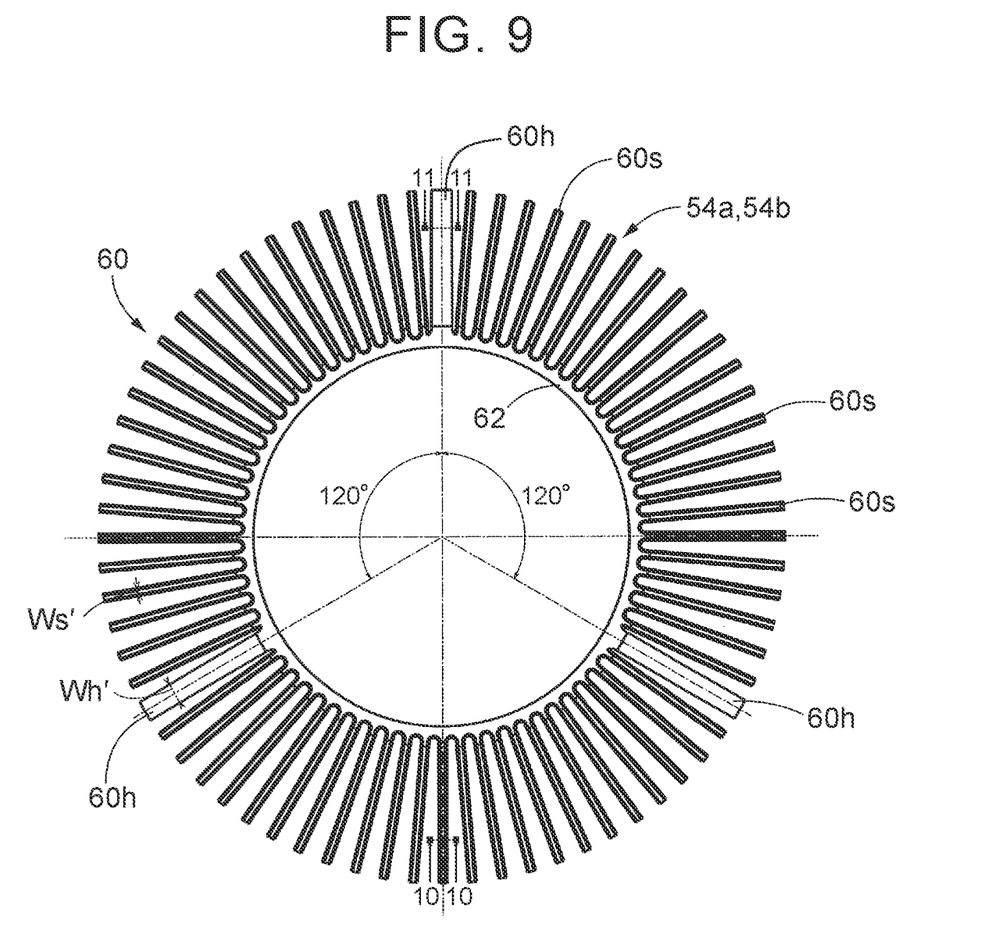
FIG. 9 is a front view of a fourth member that is a component of the brake disc.

In a second example, as shown in FIG. 7A to FIG. 11, a brake disc 50 serving as the brake disc D includes a pair of (two) first members 52a, 52b, two second members 54a, 54b, and one third member 56. Each of the two first members 52a, 52b has an almost annular plate shape and has a sliding surface S' that is engaged with a friction engaging member. As shown in FIG. 9, each of the second members 54a, 54b includes a plurality of fins 60, and a fin holding part 62 that holds the fins 60. The fin holding part 62 has an almost annular plate shape, and does not include a mounting part on a hub.

Figure 10:
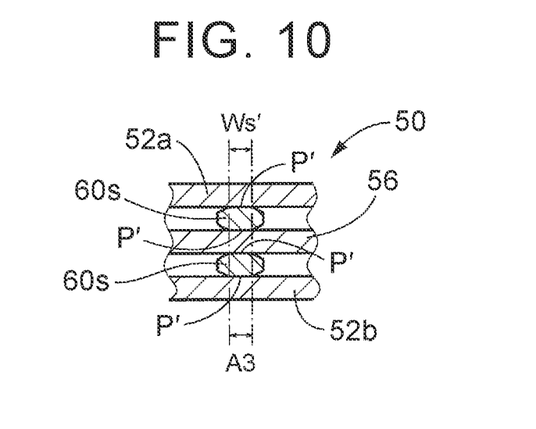
FIG. 10 is a sectional view taken along the line 10-10 in FIG. 9.
Figure 11:
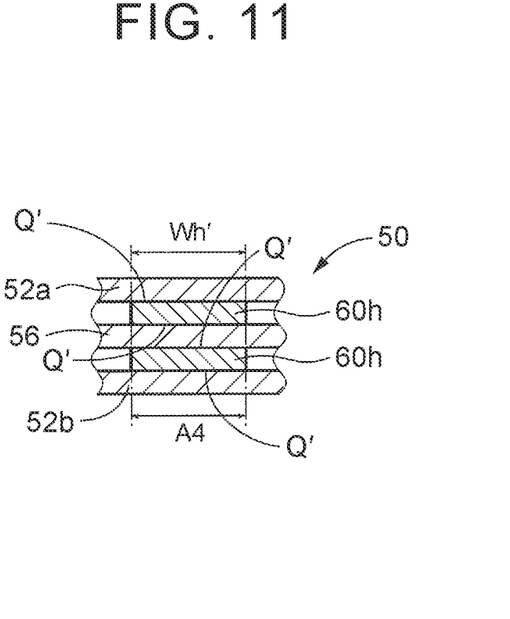
FIG. 11 is a sectional view taken along the line 11-11 in FIG. 9.

Similarly to the case of the first example, the fins 60 include three first fins 60h that are positioned at every central angle of 120°, and the remaining second fins 60s. As shown in FIG. 11, a sectional shape of each of the first fins 60h is almost rectangular, and, as shown in FIG. 10, a sectional shape of each of the second fins 60s is an almost rhombus shape. The section of each of the second fins 60s has a shape in which vertices of a rhombus are cut out so as to have flat surfaces. Contact surfaces of each of the second fins 60s with the first member 52a or 52b and the third member 56, respectively, are flat surfaces P' that are made by cutting the vertices as described above. Compared to an area A3 of each of the flat surfaces P' of each of the second fins 60s, an area A4 of each contact surface Q' of each of the first fins 60h with the first member 52a or 52b, or the third member 56 is larger. Further, compared to a width Ws' of the flat surfaces P' serving as the contact surfaces, a width Wh' of the contact surfaces Q' is larger.

As shown in FIG. 8, the third member 56 has an almost disc shape, and has a mounting part 70 in a center part of the third member 56. The mounting part 70 is used to mount the brake disc 50 on a hub. Similarly to the case according to the first example, the mounting part 70 includes a central through-hole 72 and a plurality of bolt mounting holes 74 formed around the central through-hole 72. Further, a diameter of the third member 56, an outside diameter of the first members 52a, 52b, and a diameter of a circle defined by distal ends of the fins 60 of the second members 54a, 54b are almost the same as each other.

A manufacturing method for the brake disc 50 is described. (I) The first members 52a, 52b, the second members 54a, 54b, and the third member 56 are manufactured by pressing (a pressing step). (II) The third member 56 is positioned in the center, and the second members 54a, 54b are positioned on both sides of the third member 56, respectively. Then, the first members 52a, 52b are superimposed on the second members 54a, 54b through copper foils, respectively, in a state where the sliding surfaces S' are positioned on the opposite sides from one another. (III) In this state, the first members 52a, 52b, the second members 54a, 54b, and the third member 56 are heated to copper melting temperature or higher (a joining step, a welding step). Thus, the first members 52a, 52b, the second members 54a, 54b, and the third member 56 are joined to each other, and the brake disc 50 is thus manufactured. In the brake disc 50 according to this example, it is also possible to improve cooling performance, and reduce weight and cost.

The disclosure can also be carried out in various other forms in which various changes and improvements are made based on knowledge of a person skilled in the art.

(1) The disclosure provides a brake disc that is able to rotate integrally with a vehicle wheel. The brake disc has a pair of sliding surfaces on which a friction engaging member of a friction brake is able to slide. The friction brake suppresses rotation of the wheel. The brake disc includes a pair of first members and at least one second member. Each of the first members has an almost disc shape or an almost annular plate shape, and has the sliding surface. The at least one second member includes a plurality of fins and a fin holding part that holds the fins and has an almost disc shape or an almost annular shape. The brake disc is made as the first members and the at least one second member are joined to each other in a state where the sliding surfaces are positioned on opposite sides from each other. The first members and the at least one second member may be joined by welding or the like, with use of a plurality of joining members, and so on. The fin holding part of the second member has the almost disc shape or the almost annular shape, but may also have a shape having a projecting part (for example, a hat part with a small offset quantity).

(2) The disclosure provides the brake disc described in (1) in which each of the first members and the at least one second member is manufactured by pressing of a metal plate. Although a metal material is used to manufacture each of the first members and the second member, any kind of metal material may be used. For example, aluminum, stainless steel, iron, and so on may be used to manufacture each of the first members and the at least one second member. This is the same for the third member.

(3) The disclosure provides the brake disc described in (1) or (2), in which the brake disc is made as each of the first members and the at least one second member are bonded to each other by welding through the fins. For example, each of the first members and the second member may be joined to each other as a copper foil serving as an adhesive layer is superimposed between each of the first members and the at least one second member and then heating is performed.

(4) The disclosure provides the brake disc described in any one of (1) to (3), in which each of the first members has the almost annular plate shape, and the fin holding part is formed in the almost disc shape and includes a mounting part that is formed in a center part of the fin holding part and allows the brake disc to be mounted on a hub or a rotary driving shaft. The brake disc is mounted on the wheel through the mounting part so that the brake disc is able to rotate integrally with the wheel. The brake disc may be mounted on the wheel through a hub, or may be mounted on a rotary driving shaft of an in-wheel motor or the like without a hub.

(5) The disclosure provides the brake disc described in any one of (1) to (3), in which each of the first members has the almost annular plate shape, and the fin holding part has the almost annular shape. The brake disc includes two of the second members as the at least one second member, and one third member that has an almost disc shape. The third member has a mounting part in a center part of the third member. The mounting part allows the brake disc to be mounted on a hub or a rotary driving shaft. The first members, the two second members, and the one third member are joined to each other in a state where the second members are positioned on both sides of the one third member, respectively, and the first members are positioned on outer sides of the second members, respectively. The brake disc is mounted on the wheel through the third member. The brake disc may be mounted on the wheel with use of the hub, or may be mounted on the rotary driving shaft of an in-wheel motor or the like without a hub. Although the second member includes the fins, the second member does not include a mounting part on the hub or the rotary driving shaft. Although the third member includes the mounting part on the hub or the rotary driving shaft, the third member does not include fins. Although the third member has the almost disc shape, the third member may also have a projecting part (for example, a hat part with a small offset quantity).

(6) The disclosure provides the brake disc described in (5) in which the third member is manufactured by pressing of a metal plate.

(7) The disclosure provides the brake disc described in any one of (1) to (6). In the brake disc, the fins extend radially from the fin holding part. One or more first fins out of the fins, the first fins being positioned at set intervals, have a width in a circumferential direction that is the same or larger than a width of one or more second fins in a circumferential direction. The second fins are among the fins other than the first fins. The first fins out of the fins may be, for example, positioned at intervals at a set central angle of the fin holding part or the second member, or may be positioned at intervals of a set number of the fins. It is preferred that the first fins are provided in the second member evenly without being biased. The set central angle may be, for example, 120°, 90°, 60° or the like. When the width changes in a rotation axis direction, a maximum value or a mean value of the widths may be used.

(8) The disclosure provides the brake disc described in any one of (1) to (7), in which one or more first fins out of the fins, the first fins being positioned at the set intervals, have contact surfaces with the first members, respectively. One or more second fins out of the fins other than the one or more first fins, have contact surfaces with the first members, respectively. An area of each of the contact surfaces of each of the first fins is larger than an area of each of the contact surfaces of each of the second fins. There are instances where each of the fins of the second member may have not only the contact surface with the first member, but also a contact surface with the third member. In each of the fins, an area of the contact surface with the first member and an area of the contact surface with the third member are almost the same.

(9) The disclosure provides the brake disc described in any one of (1) to (8), in which the fins extend radially from the fin holding part. One or more first fins out of the fins, the first fins being positioned at the set intervals, have almost rectangular sections orthogonal to a radial direction of the second member, and one or more second fins out of the fins other than the one or more first fins have almost rhombus sections orthogonal to the radial direction of the second member. The section of the second fin may have a shape in which vertices of the rhombus are cut so as to have flat surfaces, respectively.

(10) The disclosure provides a brake disc manufacturing method that is a manufacturing method for a brake disc that includes a pair of sliding surfaces and is able to rotate integrally with the wheel. On the sliding surfaces, a friction engaging member of a friction brake slides. The friction brake suppresses rotation of a vehicle wheel. The brake disc includes a pair of first members and at least one second member. Each of the first members has an almost disc shape or an almost annular plate shape, and has the sliding surface. The second member includes a plurality of fins, and a fin holding part that holds the fins and has an almost disc shape or an almost annular shape. The manufacturing method includes a pressing step and a joining step. In the pressing step, each of the first members and the at least one second member is manufactured by pressing. In the joining step, the first members and the at least one second member manufactured in the pressing step are joined to each other in a state where the sliding surfaces are positioned on opposite sides from each other. In the joining step, any method may be used to join the first members and the second member to each other. Technical characteristics described in any one of (1) to (9) may be used in the manufacturing method.

(11) The disclosure provides the brake disc manufacturing method described in (10). In this manufacturing method, the joining step is a welding step in which the first members and the at least one second member are bonded to each other by welding as an adhesive layer is interposed between each of the first members and the at least one second member and heated. As the adhesive layer, for example, a copper foil may be used.

(12) The disclosure provides the brake disc manufacturing method described in (10) or (11) in which each of the first members has an almost annular plate shape, and the fin holding part has an almost annular shape. The brake disc includes two of the second members as the at least one second member, and one third member that has an almost disc shape, and has a mounting part in a center part of the third member. The mounting part allows the brake disc to be mounted on a hub or a rotary driving shaft. The one third member and the two second members are manufactured by pressing in the pressing step. In the joining step, the first members, the two second members, and the one third member are joined to each other in a state where the second members are positioned on both sides of the third member, respectively, the third member being manufactured in the pressing step, and the first members are positioned on outer sides of the second members, respectively.

(13) The disclosure provides a disc brake that includes a brake disc, a pair of friction engaging members, and a pressing device. The brake disc is able to rotate integrally with a vehicle wheel. The friction engaging members are positioned on both sides of the brake disc, respectively. The pressing device presses the friction engaging members against a pair of sliding surfaces of the brake disc, respectively. The brake disc includes a pair of first members and at least one second member. Each of the first members has an almost disc shape or an almost annular plate shape, and has the sliding surface. The at least one second member includes a plurality of fins extending in a radial direction, and a fin holding part that holds the fins and has an almost disc shape or an almost annular shape. The disc brake is made as the first members and the at least one second member are joined to each other in a state where the sliding surfaces are positioned on opposite sides from each other. The characteristics of the brake disc described in (1) to (12) may be employed in the brake disc of the disc brake described in this paragraph.

What is claimed is:

1. A brake disc that is able to rotate integrally with a vehicle wheel, the brake disc having a pair of sliding surfaces on which a friction engaging member of a friction brake that suppresses rotation of the wheel is able to slide, the brake disc comprising:
   a pair of first members, each of the first members having an almost disc shape or an almost annular plate shape, and each of the first members comprising one of the sliding surfaces; and
   at least one second member that includes a plurality of fins and a fin holding part that holds the fins and has an almost disc shape or an almost annular shape, wherein the first members and the at least one second member are joined to each other in a state where the sliding surfaces are positioned on opposite sides from each other, wherein:
      each of the fins extends radially from the fin holding part; and
      wherein the fins comprise first fins and second fins, wherein the first fins are positioned at set intervals and each of the first fins has contact surfaces that contact with the first members, respectively, wherein each of the second fins has contact surfaces that contact with the first members, respectively, and an area of each of the contact surfaces of each of the first fins is larger than an area of each of the contact surfaces of each of the second fins, and a number of the second fins is more than a number of the first fins, and the second fins are provided between each of the first fins positioned at intervals of a set central angle.

2. The brake disc according to claim 1, wherein each of the first members and the at least one second member is manufactured by pressing of a metal plate.

3. The brake disc according to claim 1, wherein the brake disc is made as each of the first members and the at least one second member are bonded to each other by welding through the fins.

4. The brake disc according to claim 1, wherein the fin holding part includes a mounting part that is formed in a center part of the fin holding part and allows the brake disc to be mounted on a hub or a rotary driving shaft.

5. The brake disc according to claim 1, wherein:
the at least one second member includes two second members, and the brake disc further includes one third member that has an almost disc shape and has a mounting part in a center part of the third member, the mounting part allowing the brake disc to be mounted on a hub or a rotary driving shaft; and
the first members, the two second members, and the one third member are joined to each other in a state where the second members are positioned on both sides of the one third member, respectively, and the first members are positioned on outer sides of the second members, respectively.

6. The brake disc according to claim 1, wherein:
the first fins have almost rectangular sections orthogonal to a radial direction of the second member, and the second fins have almost rhombus sections orthogonal to the radial direction of the second member.

7. A brake disc manufacturing method that is a manufacturing method for a brake disc that includes a pair of sliding surfaces on which a friction engaging member of a friction brake slides, the friction brake suppressing rotation of a vehicle wheel, the brake disc being able to rotate integrally with the wheel, wherein:
the brake disc includes
a pair of first members, each of the first members having an almost disc shape or an almost annular plate shape, and each of the first members comprising one of the sliding surfaces; and
at least one second member that includes a plurality of fins and a fin holding part that holds the fins and has an almost disc shape or an almost annular shape;
wherein:
each of the fins extends radially from the fin holding part; and
wherein the fins comprise first fins and second fins, wherein the first fins are positioned at set intervals and each of the first fins has contact surfaces that contact with the first members, respectively, wherein each of the second fins has contact surfaces that contact with the first members, respectively, and an area of each of the contact surfaces of each of the first fins is larger than an area of each of the contact surfaces of each of the second fins, and
a number of the second fins is more than a number of the first fins, and the second fins are provided between each of the first fins positioned at intervals of a set central angle, and
the manufacturing method includes:
a pressing step in which each of the first members and the at least one second member is manufactured by pressing; and
a joining step in which the first members and the at least one second member manufactured in the pressing step are joined to each other in a state where the sliding surfaces are positioned on opposite sides from each other.

8. The brake disc manufacturing method according to claim 7, wherein the joining step is a welding step in which the first members and the at least one second member are bonded to each other by welding as an adhesive layer is interposed between each of the first members and the at least one second member and heated.

9. The brake disc manufacturing method according to claim 7, wherein:
the at least one second member includes two second members, and the brake disc further includes one third member that has an almost disc shape and a mounting part in a center part of the third member, the mounting part allowing the brake disc to be mounted on a hub or a rotary driving shaft;
the one third member and the two second members are manufactured by pressing in the pressing step; and
the first members, the two second members, and the one third member are joined to each other in the joining step in a state where the second members are positioned on both sides of the third member, respectively, the third member being manufactured in the pressing step, and the first members are positioned on outer sides of the second members, respectively.

* * * * *